United States Patent
Liu (10) Patent No.: US 10,511,796 B1
(45) Date of Patent: Dec. 17, 2019

(54) IMAGE SENSOR SYSTEM, ASSOCIATED READOUT CIRCUIT THEREOF AND ASSOCIATED METHOD

(71) Applicant: TAIWAN SEMICONDUCTOR MANUFACTURING COMPANY LTD., Hsinchu (TW)

(72) Inventor: Chih-Min Liu, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 21 days.

(21) Appl. No.: 16/046,759

(22) Filed: Jul. 26, 2018

(51) Int. Cl.
H04N 5/378 (2011.01)
H04N 5/376 (2011.01)
G01J 1/44 (2006.01)

(52) U.S. Cl.
CPC ............... *H04N 5/378* (2013.01); *G01J 1/44* (2013.01); *H04N 5/3765* (2013.01); *G01J 2001/442* (2013.01); *G01J 2001/4466* (2013.01)

(58) Field of Classification Search
CPC ......... H04N 5/378; H04N 5/3765; G01J 1/44; G01J 2001/442; G01J 2001/4466
USPC ........................................................ 348/294
See application file for complete search history.

(56) References Cited

U.S. PATENT DOCUMENTS

| | | | |
|---|---|---|---|
| 9,419,635 B2 * | 8/2016 | Kumar | G01T 1/1647 |
| 9,784,612 B2 * | 10/2017 | Sanson | G01J 1/46 |
| 10,079,608 B2 * | 9/2018 | Kumar | G01T 1/1647 |
| 10,178,336 B2 * | 1/2019 | Rizk | G01J 1/44 |
| 10,217,889 B2 * | 2/2019 | Dhulla | H01L 31/107 |
| 2010/0226495 A1 * | 9/2010 | Kelly | G11B 20/00086 380/30 |
| 2013/0099091 A1 * | 4/2013 | Nemirovsky | H01L 31/024 250/206 |
| 2013/0112848 A1 * | 5/2013 | Lin | G01J 1/44 250/206 |
| 2014/0118730 A1 * | 5/2014 | Kavaldjiev | H01L 27/1446 356/237.5 |
| 2014/0226166 A1 * | 8/2014 | Kumar | G01T 1/1647 356/601 |

(Continued)

OTHER PUBLICATIONS

Niclass, C., Favi, C., Kluter, T., Gersbach, M., & Charbon, E (2008). A 128×128 Single-Photon Image Sensor With Column-Level 10-Bit Time-to-Digital Converter Array. IEEE Journal of Solid-State Circuits, 43(12), 2977-2989. doi:10.1109/jssc.2008.2006445.

*Primary Examiner* — Pritham D Prabhakher
(74) *Attorney, Agent, or Firm* — WPAT, P.C., Intellectual Property Attorneys; Anthony King (57) ABSTRACT

An image sensor system, including: an image sensor, a readout circuit, and a timing control circuit. The image sensor includes a plurality of diodes, and one of the plurality of diodes outputs a sensing current when a photon is detected. The readout circuit is coupled to the image sensor and arranged to selectively operate in at least a first mode and a second mode. The timing control circuit is coupled to the readout circuit and is arranged to determine if a coding condition is fit according to an input signal and generate a control signal when the coding condition is fit, wherein the input signal input signal includes a plurality of bits serially input to the timing control circuit, and each bit of the plurality of bits corresponds to each pulse of a clock signal respectively.

20 Claims, 10 Drawing Sheets

(56) References Cited

U.S. PATENT DOCUMENTS

| | | | | |
|---|---|---|---|---|
| 2014/0232827 A1* | 8/2014 | Kumar | ............... | G01T 1/1647 |
| | | | | 348/46 |
| 2014/0339398 A1* | 11/2014 | Mazzillo | ............ | H01L 31/107 |
| | | | | 250/208.2 |
| 2016/0003674 A1* | 1/2016 | Sanson | ................. | G01J 1/46 |
| | | | | 356/215 |
| 2016/0218236 A1* | 7/2016 | Dhulla | ............... | H01L 31/107 |
| 2018/0278877 A1* | 9/2018 | Yamahira | ........ | H01L 27/14609 |

\* cited by examiner

IMAGE SENSOR SYSTEM, ASSOCIATED READOUT CIRCUIT THEREOF AND ASSOCIATED METHOD

BACKGROUND

Traditionally, a Single Photon Avalanche Diode (SPAD) is applied as an image sensor to count the incident photons, or is applied to a Time-of-flight (ToF) application by applying a Time-to-Digital Converter (TDC) to measure the travel time of the photons. For each of the aforementioned applications, a specific readout circuit must be applied. In the testing procedure, however, the pin count and chip area are limited in a miniature size application. For example, a scribe line testing application or an Internet of Thing application. Therefore, a novel architecture of the readout circuit is desired for a SPAD applied to different applications at the same time to solve the aforementioned problems.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

Figure 1:
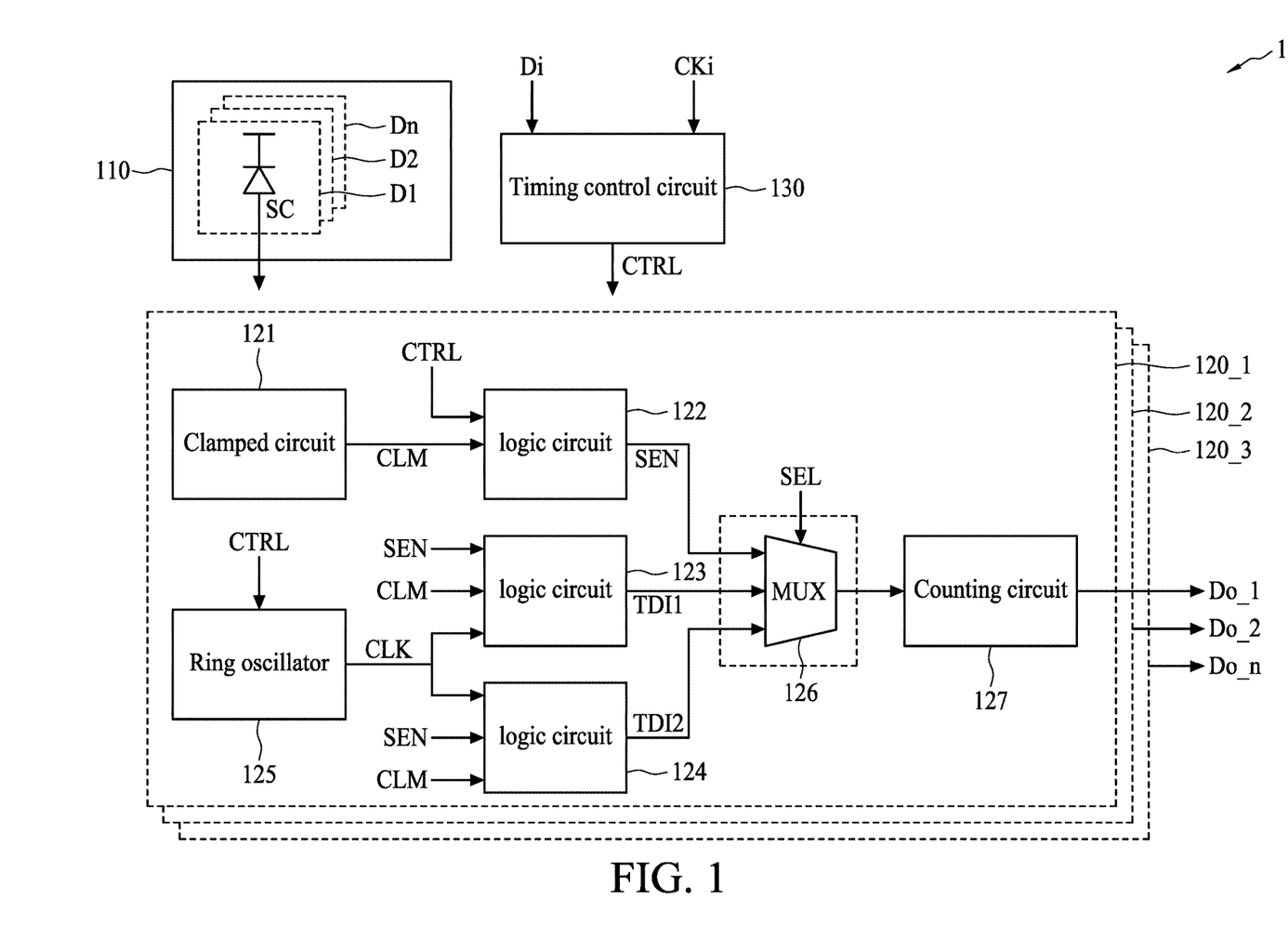
FIG. 1 is a diagram illustrating an image sensor system according to an embodiment of the present disclosure.

FIG. 1 is a diagram illustrating an image sensor system 10 according to an embodiment of the present disclosure. As shown in FIG. 1, the image sensor system an image sensor 110, readout circuits 120_1-120_n, and a timing control circuit 130. The image sensor 110 includes a plurality of diodes D1-Dn, wherein n is a positive integer, and each diode corresponds to one of the readout circuits 120_1-120_n for generating a digital output Do_1-Do_n, respectively. In this embodiment, the diodes D1-Dn are Single Photon Avalanche Diodes (SPADs), and each of the diodes D1-Dn generates a sensing current SC when a photon is detected thereby. Those skilled in the art should readily understand the operation of the SPAD, the detailed description is omitted here for brevity. The timing control circuit 130 is arranged to receive an input signal Di and a clock signal CKi, and determine if a coding condition is fit according to the input signal. The timing control circuit is further arranged to generate a control signal CTRL when the coding condition is fit. The input signal Di is a digital signal including a plurality of bits serially input to the timing control circuit, and each bit of the plurality of bits corresponds to each pulse of the clock signal Cki. In other words, the logic value of the input signal Di is updated for every pulse of the clock signal CKi. In this embodiment, the input signal Di is generated by a testing machine (not shown in FIG. 1) installed outside the image sensor system 10. However, this is not a limitation of the present disclosure.

Each of the readout circuit 120_1-120_n selectively operates in a photon counting mode, a time of flight mode and an after pulsing mode, wherein each of the readout circuit 120_1-120_n counts a number of the photons detected by the corresponding diode when operates in the photon counting mode, counts a length of time period from a photon being emitted to the photon being detected when operates in the time of flight mode, and counts a length of time period from a first photon being detected to a second photon being detected when operates in the after pulsing mode. It should be noted that, when operating in the after pulsing mode, it is not limited to counts the length of time period from two consecutive photon being detected. In other embodiments, a length of time period between any two photons being detected is counted when operating in the after pulsing mode. The detailed implementation of the circuits for achieving the aforementioned goals will be discussed later. Each of the readout circuit 120_1-120_n includes a clamping circuit 121, logic circuits 122, 123, and 124, a ring oscillator 125, a multiplexing circuit 126, and a counting circuit 127. The clamping circuit 121 is arranged to generate a clamped signal CLM according to the received sensing current SC. More specifically, the clamped signal CLM is asserted as a pulse when the sensing current SC is received by the clamp circuit as shown in FIG. 1. The logic circuit 122 coupled to the clamping circuit 121 is arranged to execute a conversion operation upon the pulse of the clamped signal CLM and the control signal CTRL to generate a sensing signal SEN The logic circuits 123 and 124 are arranged to generate time indicating signals TID1 and TID2, respectively, according to the sensing signal SEN, the control signal CTRL and an oscillated signal CLK generated by the ring oscillator 125, wherein the ring oscillator 125 generates the oscillated signal CLK by being triggered by the control signal CTRL when the control signal CTRL is pulled up, and the logic circuits 123 and 124 are utilized by each of the readout circuit 120_1-120_n when operates in the time of flight mode and the after pulsing mode, respectively. In other words, the ting oscillator 125 generates the oscillated signal CLK at a trigger time point of the control signal CTRL. The detailed descriptions of the operations of the logic circuits 123 and 124 will be discussed in the following paragraphs.

The multiplexing circuit 126 is arranged to select one of the sensing signal SEN, the time indicating signals TDI1 and the time indicating signal TDI2 according to the operating mode of the readout circuit, and output the selected signal to the counting signal 127, wherein the multiplexing circuit 126 includes a multiplexer MUX which is instructed by a selecting signal SEL. More specifically, the multiplexer MUX outputs the sensing signal SEN when operating in the photon counting mode, while outputs the time indicating signals TDI1 and TDI2 when operating in the time of flight mode and the after pulsing mode, respectively. The counting circuit 127 coupled to the multiplexing circuit 126 is arranged to count the number of the detected photons when the readout circuit operates in the first mode, and calculate a length of time period from a photon being emitted to the photon being detected when operates in the time of flight mode, and counts a length of time period from a first photon being detected to a second photon being detected when operates in the after pulsing mode.

Figure 2A:
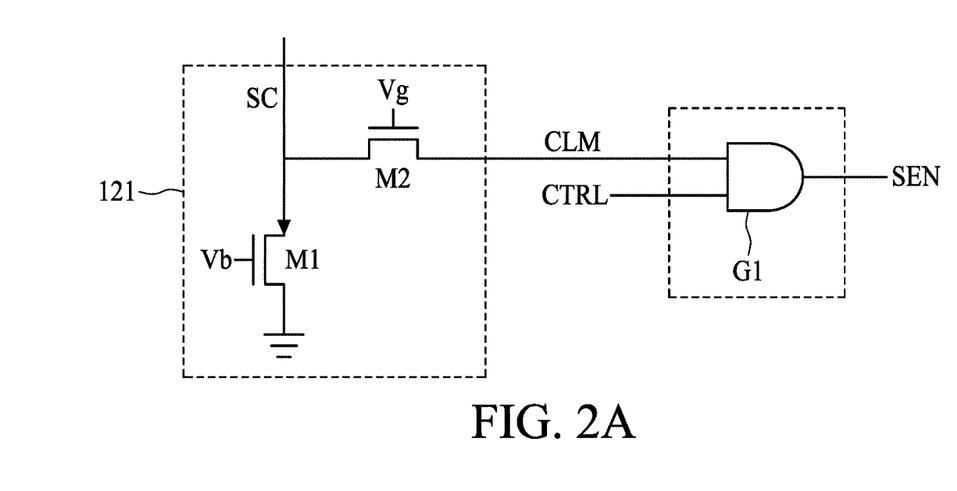
FIG. 2A is a diagram illustrating a clamping circuit and a logic circuit according to an embodiment of the present disclosure.
Figure 2B:
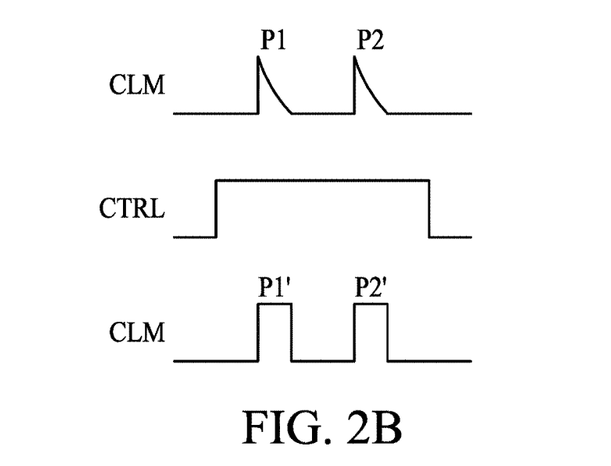
FIG. 2B is a diagram illustrating waveforms of the clamped signal, the control signal and the sensing signal according to an embodiment of the present disclosure.

FIG. 2A is a diagram illustrating the clamping circuit 121 and the logic circuit 122 according to an embodiment of the present disclosure. As shown in FIG. 2A, the clamping circuit 121 includes Metal-Oxide-Semiconductor Field-Effect Transistors (MOSFETs) M1 and M2, and the logic circuit 122 includes an AND gate G1. The MOSFET (hereinafter transistor) M1 receives the sensing current SC, and generates a voltage signal at a drain terminal thereof. The transistor M2 is controlled by a clamping voltage Vg at a gate terminal thereof. In this way, when the transistor M1 receives the sensing current SC, the amplitude of the clamped signal CLM is clamped by the transistor M2 due to the clamping voltage Vg at the gate terminal to protect the readout circuit. The AND gate G1 executes a conversion operation (i.e. the AND function) upon the clamped signal CLM and the control signal CTRL to generate the sensing signal SEN. FIG. 2B is a diagram illustrating waveforms of the clamped signal CLM, the control signal CTRL and the sensing signal SEN according to an embodiment of the present disclosure. For example, the diode D1 generates the sensing current SC when a photon is detected, and the clamped circuit 121 therefore generates the clamped signal CLM with a pulse P1. The logic circuit 122 executes the conversion operation (i.e. the AND function) upon the clamped signal CLM with the pulse P1 and the control signal CTRL to generate the sensing signal SEN with a pulse P1'. Likewise, the diode generates the sensing current SC when another photon is detected, and the clamped circuit 121 therefore generates the clamped signal CLM with a pulse P2. The logic circuit 122 executes the conversion operation (i.e. the AND function) upon the clamped signal CLM with the pulse P2 and the control signal CTRL to generate the sensing signal SEN with a pulse P2'.

Figure 3:
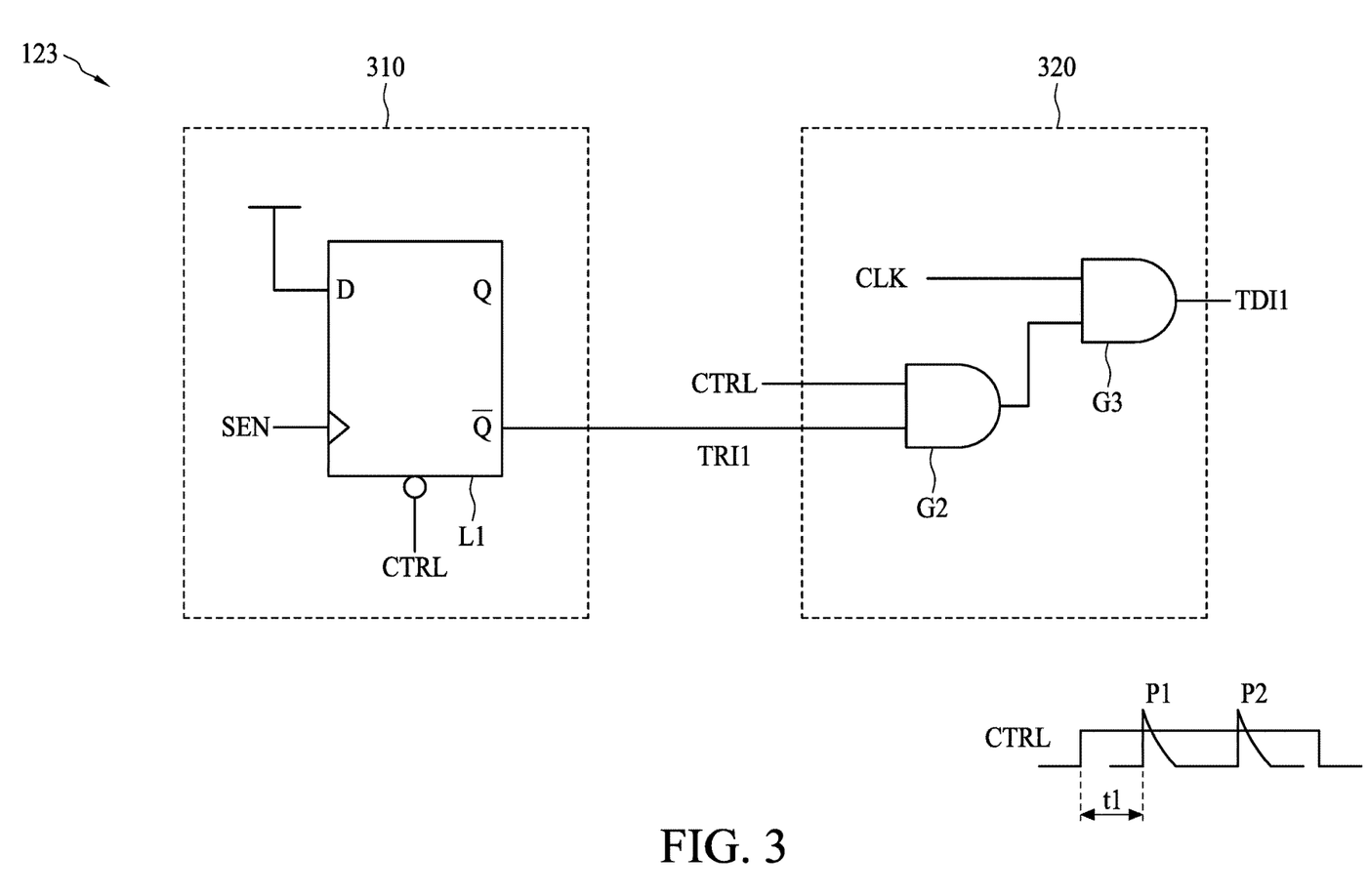
FIG. 3-FIG. 5 are diagrams illustrating a logic circuit according to an embodiment of the present disclosure.

FIG. 3 is a diagram illustrating the logic circuit 123 according to an embodiment of the present disclosure. The logic circuit 123 operates when the readout circuit 120_1 operates in the time of flight mode. As shown in FIG. 3, the logic circuit 123 includes a latching circuit 310 and a conversion circuit 320, wherein the latching 310 including a D flip flop L1 is arranged to generate a trigger signal TRI1 according to the sensing signal SEN and the control signal CTRL, and the conversion circuit 320 including AND gates G2 and G3 is arranged to selectively output the oscillated signal CLK according to the trigger signal TRI1. The D flip flop L1 is triggered by the sensing signal SEN and reset by the inverse of the control signal CTRL. The AND gate G2 executes an AND function upon the inverse output of the D flip flop L1 and the control signal CTRL, while the AND gate G3 executes an AND function upon the output of the AND gate G2 and the oscillated signal CLK to generate the time indicating signal TDI1. More specifically, refer to FIG. 3 in conjunction with FIG. 2B, when the control signal CTRL stays low (i.e. the logic value '0'), the D flip flop L1 is reset and the inverse output thereof outputs a logic value '1' while the AND gate G2 outputs a logic value '0' accordingly. Therefore, the AND gate G3 outputs a logic value '0' as the time indicating signal TID1. Next, when the control signal CTRL goes high (i.e. the logic value '1'), the inverse output of the D flip flop still outputs the logic value '1' while the AND gate G2 outputs the logic value '1' instead. Therefore, the AND gate G3 outputs the oscillated signal CLK as the time indicating signal TID1. Finally, when the pulse P1 of the clamped signal CLM appears, the D flip flop L1 is triggered by the pulse P1' of the sensing signal SEN and the inverse output thereof outputs a logic value '0'.

Accordingly, the AND gate G3 outputs the logic value '0' as the timing indicating signal TDI1 to stop outputting the oscillated signal CLK.

When the selecting signal SEL instructs the multiplexing circuit 126 to operate in the time of flight mode, the multiplexing circuit 126 selects and outputs the time indicating signal TID1 to the counting circuit 127, and the counting circuit 127 therefore counts the pulses of the oscillated signal CLK when the time indicating signal TDI1 goes high and stops counting when the time indicating signal TDI1 goes low. In this way, the counting circuit 127 calculates the length of time t1, that is, the length of time from the control signal CTRL being triggered to the first photon being detected (i.e. the pulse P1 of the clamped signal CLM appears), by counting the pulses in the oscillated signal CLK.

Figure 4:
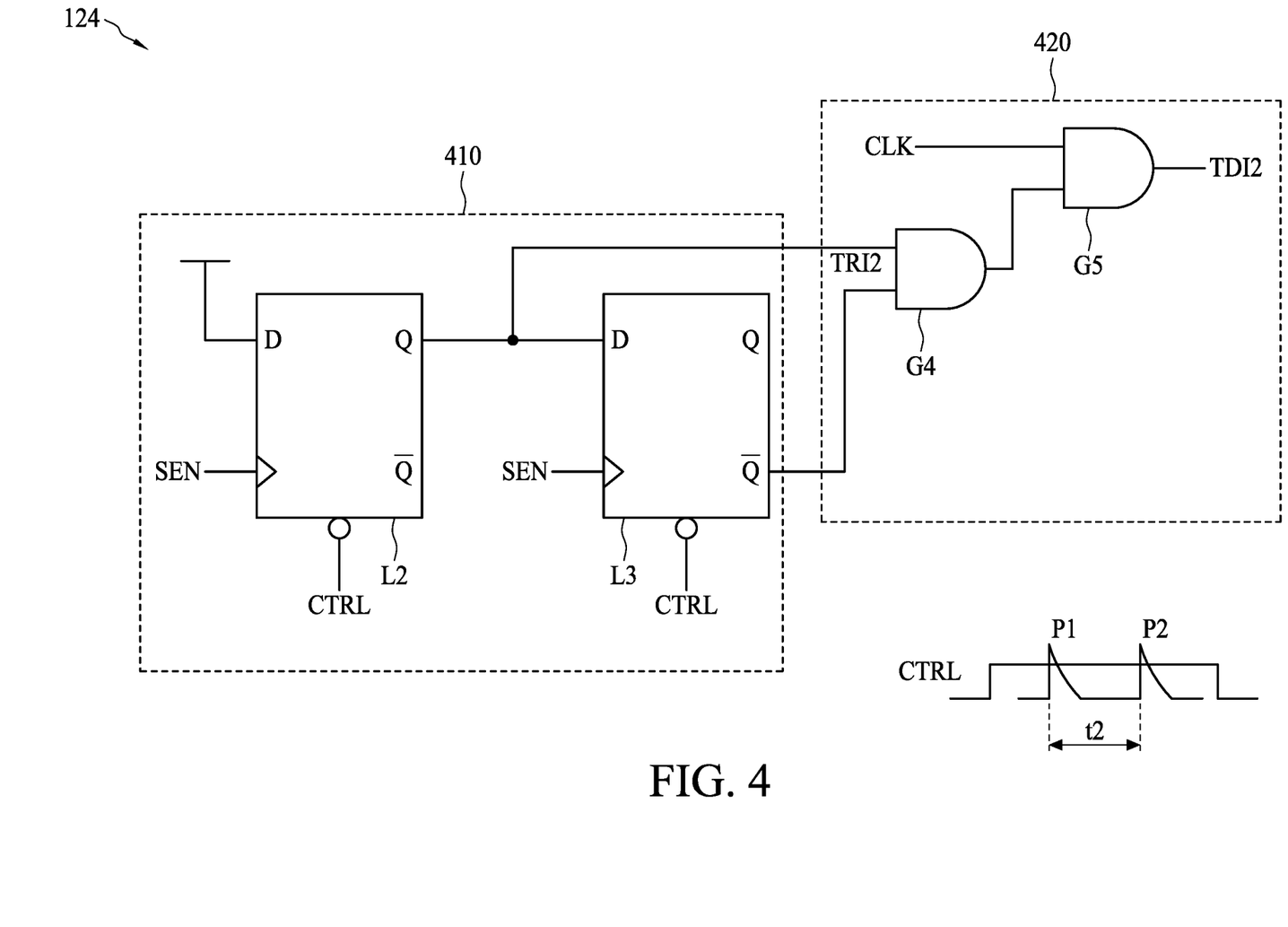

FIG. 4 is a diagram illustrating the logic circuit 124 according to an embodiment of the present disclosure. The logic circuit 124 operates when operating in the after pulsing mode. As shown in FIG. 4, the logic circuit 124 includes a latching circuit 410 and a conversion circuit 420, wherein the latching circuit 410 including D flip flops L2 and L3 is arranged to generate a trigger signal TRI2 composed by the output of the D flip flop L2 and the inverse output of the D flip flop L3 according to the sensing signal SEN and the control signal CTRL, and the conversion circuit 420 including AND gates G4 and G5 is arranged to selectively output the oscillated signal CLK according to the trigger signal TRI2. The D flip flops L2 and L3 are triggered by the sensing signal SEN and reset by the inverse of the control signal CTRL. The AND gate G4 executes the AND function upon the output of the D flip flop L2 and the inverse output of the D flip flop L3, while the AND gate G5 executes the AND function upon the output of the AND gate G4 and the oscillated signal CLK to generate the time indicating signal TDI2. More specifically, when the control signal stays low, the D flip flops L2 and L3 are reset to output the logic value '0'. Accordingly, the AND gate G5 outputs the logic value '0' as the time indicating signal TDI2. Next, when the pulse P1 of the clamped signal CLM appears, the D flip flops L2 and L3 are triggered by the pulse P1' of the sensing signal SEN. The AND gate G4 receive the logic value '1' from the output of the D flip flop L2 and the logic value '1' from the inverse output of the D flip flop L3 from the previous state. Accordingly, the AND gate G5 outputs the oscillated signal CLK as the time indicating signal TDI2. Finally, when the pulse P2 of the clamped signal CLM appears, the D flip flops L2 and L3 are triggered by the pulse P2' of the sensing signal SEN. The AND gate G4 receive the logic value '1' from the output of the D flip flop L2 and the logic value '0' from the inverse output of the D flip flop L3 from the previous state. Accordingly, the AND gate G5 outputs the logic value '0' as the time indicating signal TDI2 to stop outputting the oscillated signal CLK.

When the selecting signal SEL instructs the multiplexing circuit 126 to operate in the after pulsing mode, the multiplexing circuit 126 selects and outputs the time indicating signal TID2 to the counting circuit 127, and the counting circuit 127 therefore counts the pulses of the oscillated signal CLK when the time indicating signal TDI2 goes high and stops counting when the time indicating signal TDI2 goes low. In this way, the counting circuit 127 calculates the length t2, that is, the length of time from the pulse P1' of the clamped signal CLM to the pulse P2' of the clamped signal CLM, by counting the pulses in the oscillated signal CLK.

Figure 5:
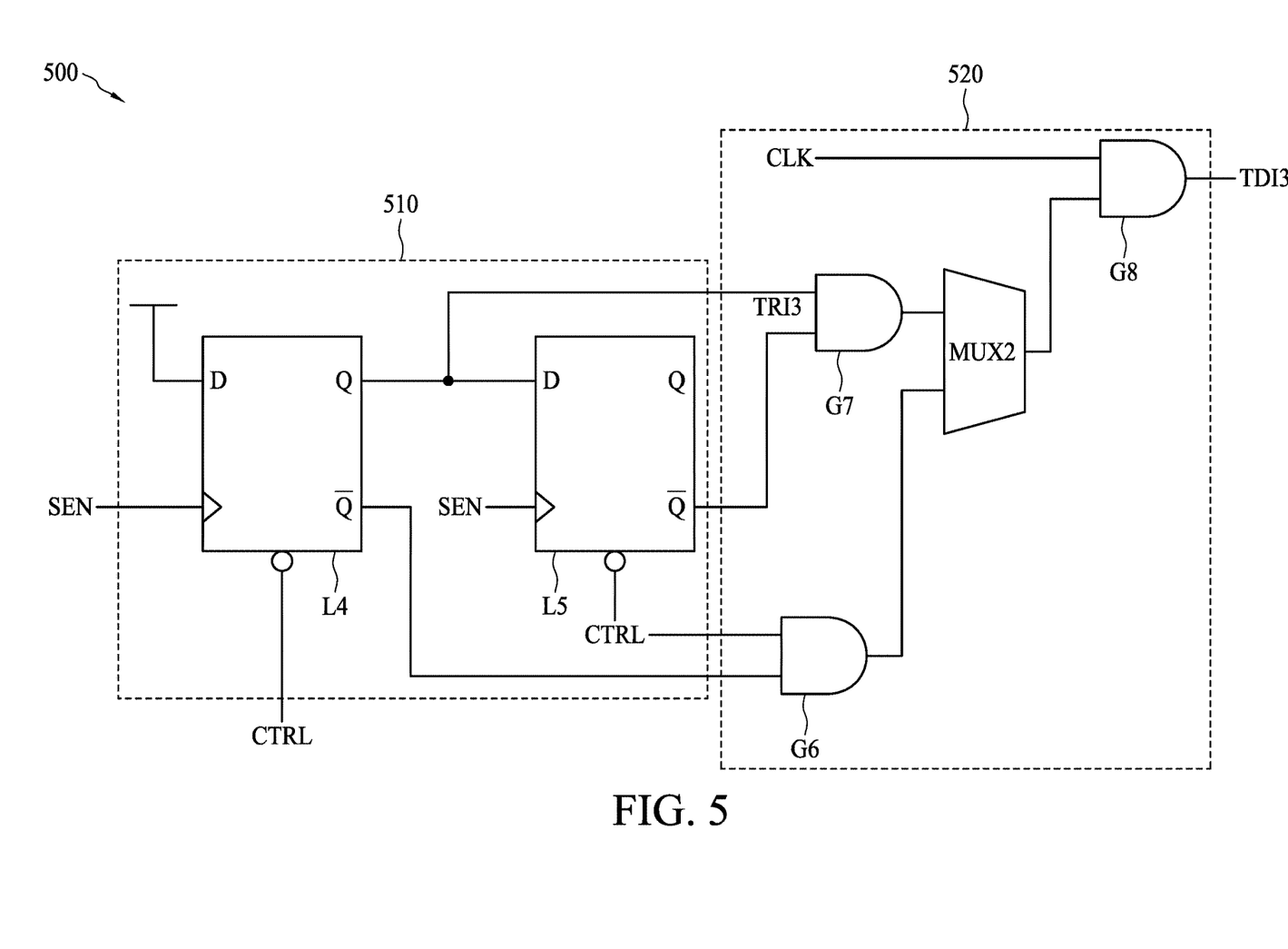

Those skilled in the art should readily understand that the logic gates shown in FIG. 1-FIG. 4 can be replaced by different logic gates to achieve the same goal. Those alternative designs shall fall within the scope of the present disclosure as well. In addition, those skilled in the art must understand that the logic circuits 123 and 124 can be easily combined after reading the embodiments of FIG. 3 and FIG. 4. FIG. 5 is a diagram illustrating a combined logic circuit 500 according to an embodiment of the present disclosure. As shown in FIG. 5, the logic circuit 500 includes a latching circuit 510 and a conversion circuit 520, wherein the latching circuit 510 including D flip flops L4 and L5 is arranged to generate a trigger signal TRI3 composed by the output of the D flip flop L4 and the inverse output of the D flip flop L5 according to the sensing signal SEN and the control signal CTRL, and the conversion circuit 520 including AND gates G6-G8 and a multiplexer MUX2 is arranged to selectively output the oscillated signal CLK as a time indicating signal TDI3 according to the trigger signal TRI3. The multiplexer MUX2 is arranged to indicate the operating mode of the readout circuit. For example, when the readout circuit operates in the time of flight mode, the multiplexer MUX2 selects and outputs the output of the AND gate G6. Accordingly, the AND gate G8 selectively outputs the oscillated signal CLK according to the value of the output of the AND gate G6. Likewise, when the readout circuit operates in the after pulsing mode, the multiplexer MUX2 selects and outputs the output of the AND gate G7. Accordingly, the AND gate G8 selectively outputs the oscillated signal CLK according to the value of the output of the AND gate G7. Those skilled in the art should readily understand the operation of the logic circuit 500 after reading the embodiments of FIG. 3 and FIG. 4. The detailed description is omitted here for brevity.

Figure 6:
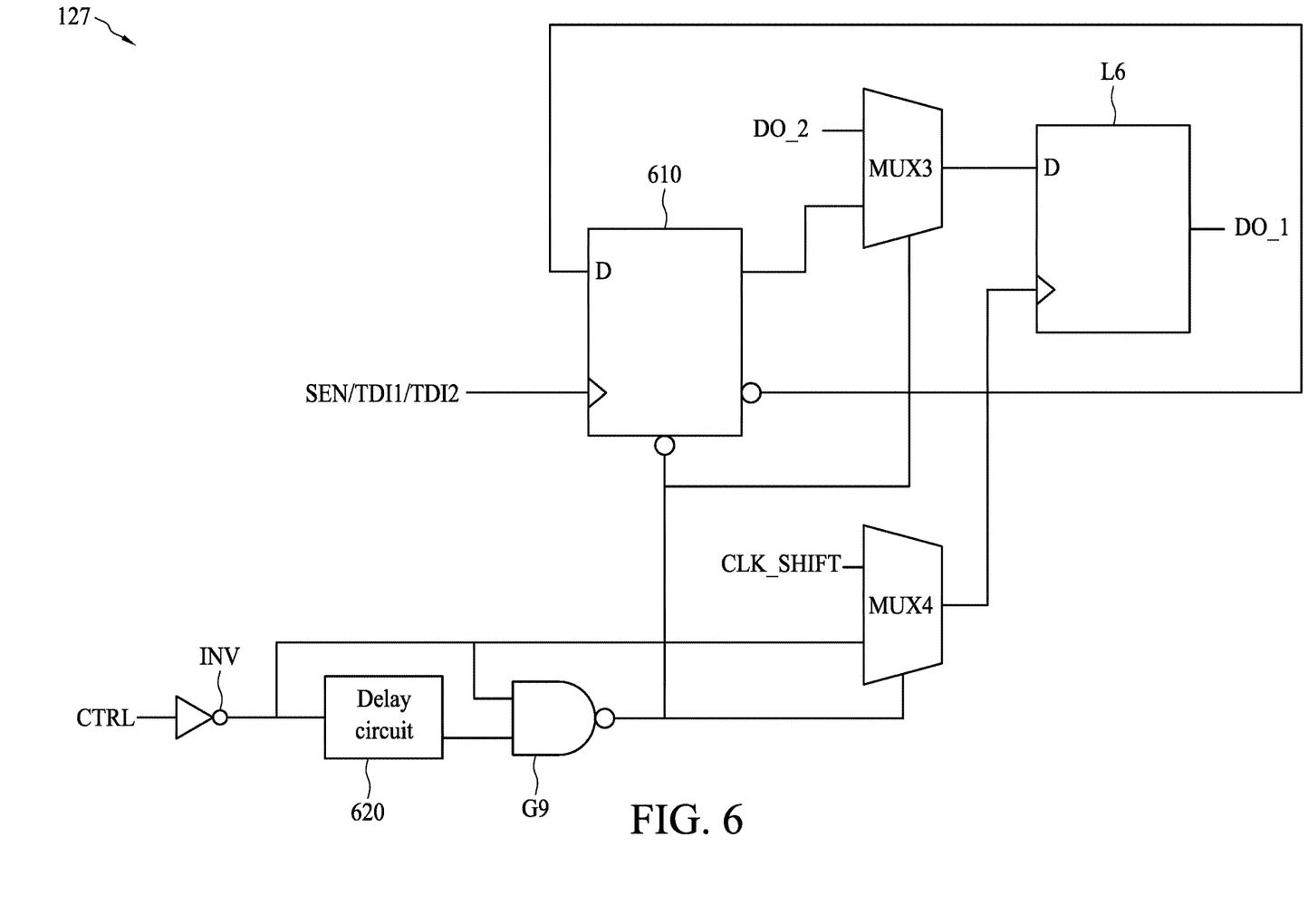
FIG. 6 is a diagram illustrating a counting circuit according to an embodiment of the present disclosure.

FIG. 6 is a diagram illustrating the counting circuit 127 according to an embodiment of the present disclosure. As shown in FIG. 6, the counting circuit 127 includes a counter 610, a delay circuit 620, an inverter INV, a D flip flop L6, a NAND gate G9 and multiplexers MUX3 and MUX4. More specifically, when the control signal CTRL goes high (i.e. the logic value '1'), the counter 610 starts counting the pulse of received signal (i.e. one of the sensing signal SEN, the time indicating signal TDI1 and the time indicating signal TDI2), and the multiplexer MUX3 outputs the counting value generated by the counter 610 to the D flip flop L6 which is triggered by the output of the inverter INV. When the control signal CTRL goes low, the counter 610 stops counting, and the multiplexer MUX3 outputs the digital output of the previously readout circuit (e.g. the digital output Do_2 generated by the readout circuit 120_2) to the D flip flop L6. Meanwhile, the D flip flop L6 outputs the stored value as the digital output Do_1, wherein the D flip flop L6 is triggered by a oscillated signal CLK_shift which is generated by dividing the oscillated signal CLK in this embodiment. In other words, the counter 610 starts counting when the control signal CTRL goes high, and stops counting when the control signal CTRL goes low. The D flip flop L6 stores the counting value generated by the counter 610 when the control signal CTRL goes high, and shifts out the counting value as the digital output when the control signal CTRL goes low. Meanwhile, the D flip flop L6 receives the digital output from the previous readout circuit. In this way, the digital outputs are shifted to the first readout circuit (i.e. the readout circuit 120_1) and outputted to following circuits.

Figure 7:
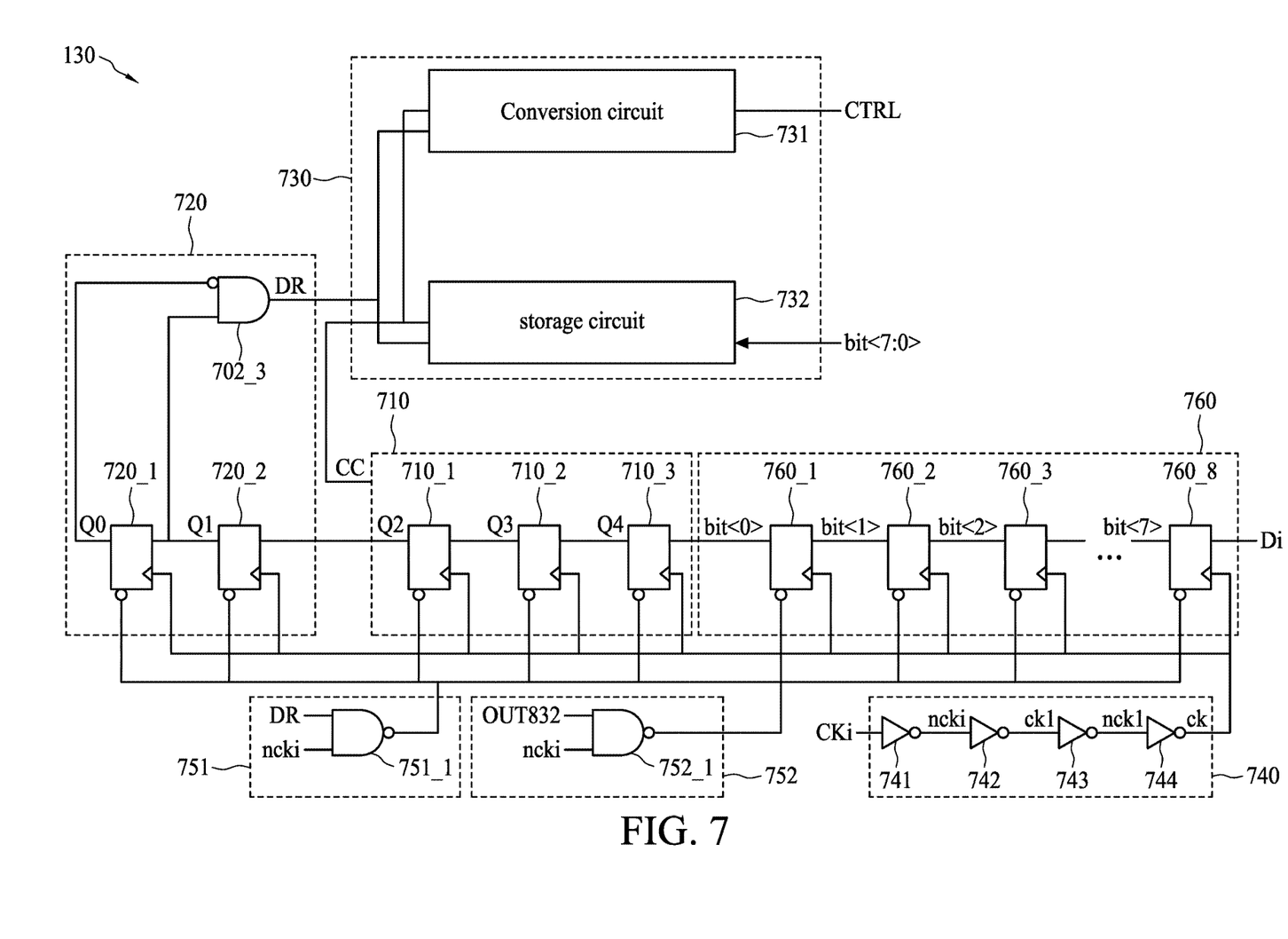
FIG. 7 is a diagram illustrating a timing control circuit of the image sensor system according to an embodiment of the present disclosure.

FIG. 7 is a diagram illustrating a timing control circuit 130 of the image sensor system 10 according to an embodiment of the present disclosure. As shown in FIG. 7, the timing control circuit 130 includes a latching circuit 710, a detecting circuit 720 and a logic circuit 730, a clock signal generating circuit 740, and reset circuits 751 and 752. The clock signal generating circuit 740 is arranged to receive the clock signal CKi, and generate delayed clock signals ncki, ck1, nck1 and ck by delaying the clock signal CKi with a plurality of inverters 741-744 included in the clock signal generating circuit 740. However, the number of the inverters and the number of the clock signals generated by the clock signal generating circuit 740 are not a limitation of the present disclosure. In other embodiment, the clock signal CKi may be directly connected to the other circuits in the timing control circuit 130 without being delayed. Those skilled in the art should readily understand the implementation of the clock signal generating circuit 740. In addition, the timing control circuit 130 further includes a register circuit 760. The register circuit 760 includes a plurality of registers 760_1-760_8, and each of the plurality of registers 760_1-760_8 is implemented by a D flip flop, wherein the number of the registers included in the register circuit 760 is not a limitation of the present disclosure, and the outputs of the registers 760_1-760_8 are marked as bit<0>, bit<1>, bit<2>, bit<3>, bit<4>, bit<5>, bit<6>, and bit<7>, respectively. Each of the plurality of registers in the register circuit 760 is arranged to receive the input signal Di in response to each pulse of the clock signal ck. That is, for each pulse of the clock signal ck being generated, the input signal Di is updated and the previous value is shifted to the next register of the register circuit 760. For example, when values of the input signal Di in response to 8 pulses of the clock signal ck is Di[8]=[0,0,0,1,1,1,0,1], the registers 760_1-760_8 stores [0,0,0,1,1,1,0,1] at their output as bit<0>, bit<1>, bit<2>, bit<3>, bit<4>, bit<5>, bit<6>, and bit<7>, respectively. Those skilled in the art should readily understand the operation of the register circuit 760 being triggered by the clock signal ck, the detailed description is omitted here. In this embodiment, the outputs of the register 760_1-760_8 (i.e. bit<7:0> marked in FIG. 7) are regarded as a data package of the input signal Di. After the clock signal ck keeps keying in, the input signal Di keep updating and the values of the outputs of the registers 760_1-760_8 are shifted to the latching circuit 710 and further to the detecting circuit 720. The detecting circuit 720 includes register 720_1-720_2 and the latching circuit 710 includes registers 710_1-710_3. In other words, the detecting circuit 720 is arranged to receive the input signal Di in response to two pulses of the clock signal ck (or two consecutive bits of the input signal Di), and the latching circuit 710 is arranged to receive the input signal in response to three pulses of the clock signal ck (or three consecutive bits of the input signal Di). As shown in FIG. 7, the outputs of the register 720_1-720_2 of the detecting circuit 720 and the registers 710_1-710_3 of the latching circuit 710 are marked as Q0, Q1, Q2, Q3 and Q4, respectively.

The detecting circuit 720 further includes an AND gate 720_3 which receives the inverse of the output Q0 and the output Q1, and generates a detecting result DR accordingly, wherein the detecting result DR indicates whether the coding condition is fit. In this embodiment, when the values of the outputs Q0 and Q1 are (0,1), the detecting result DR is a logic value '1' which indicates that the coding condition is fit. On the other hand, the logic values stored at the registers 710_1-710-3, i.e. the outputs Q2-Q4 are regarded as a control code CC. When the detecting result DR indicates that the coding condition is fit (i.e. the detecting result DR is logic value '1'), a conversion circuit 731, which is included in the logic circuit 730 and is triggered by the detecting result DR, executes a conversion operation upon the control code CC (i.e. the outputs Q2-Q4) currently stored at the latching circuit 710 to generate the control signal CTRL. For example, when the coding condition is fit and the control code CC is a code instructing a rising event of the control signal CTRL, the conversion circuit 731 executes the conversion operation upon the control code CC to pull up the control signal CTRL to the logic high (i.e. the logic value '1') from the logic low (i.e. the logic value '0'). For another example, when the coding condition is fit and the control code CC is a code instructing a falling event of the control signal CTRL, the conversion circuit 731 executes the conversion operation upon the control code CC to pull down the control signal CTRL to the logic low (i.e. the logic value '0') from the logic high (i.e. the logic value '1'). In addition, the logic circuit 730 further includes a storage circuit 732, wherein the storage circuit 732 is triggered by the detect result DR and arranged to receive the control code CC and the outputs of the registers 760_1-760_8 (i.e. bit<7:0> marked in FIG. 7). When the detect result DR indicates that coding condition is fit and the control code CC is a code instructing a store operation, the storage circuit 732 stores the outputs of the registers 760_1-760_8 (i.e. bit<7:0> marked in FIG. 7) in a register, wherein the register may or may not be implemented in the logic circuit 730 which is not a limitation of the present disclosure.

Figure 8:
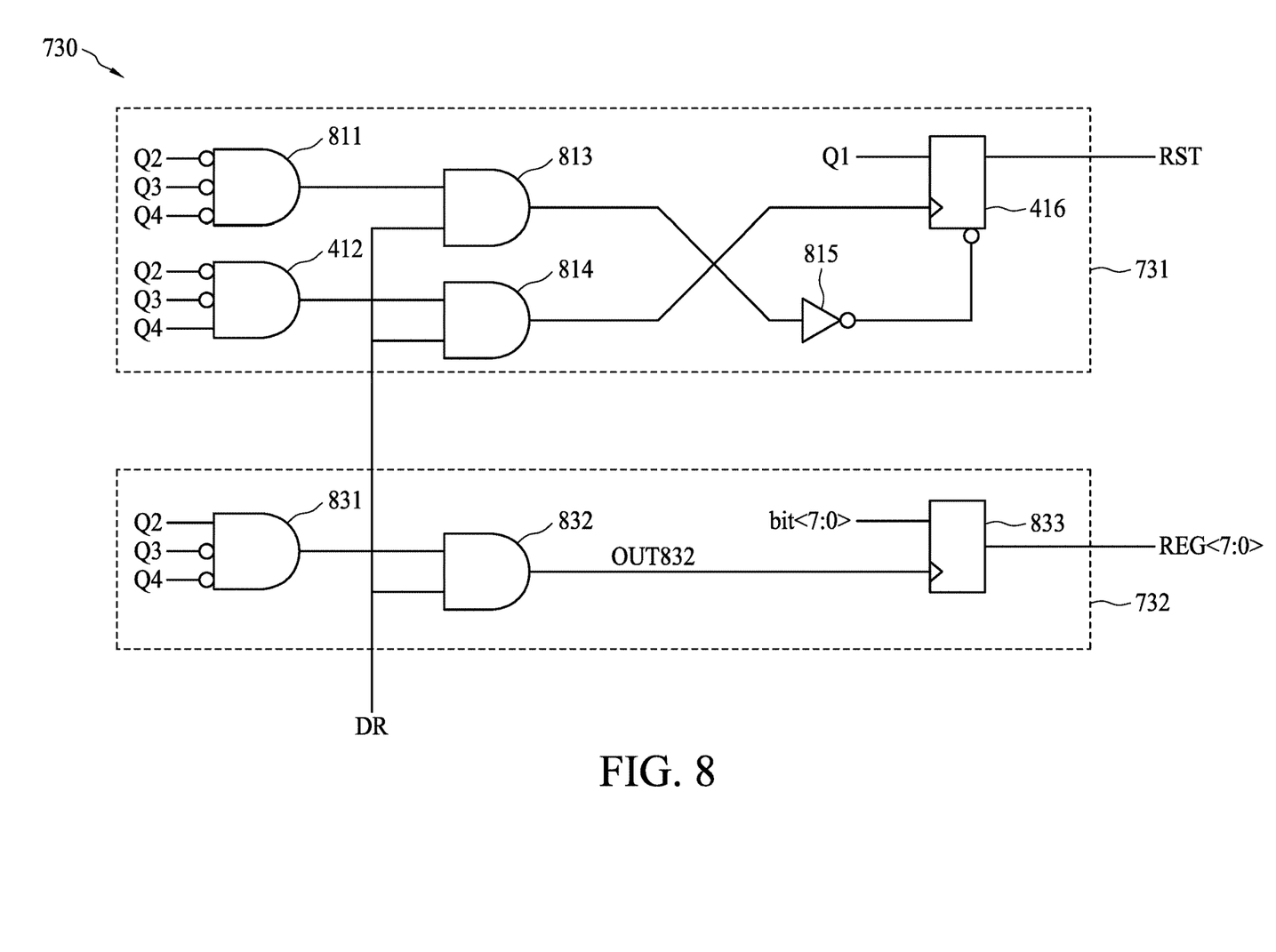
FIG. 8 is a diagram illustrating a conversion circuit and a storage circuit in a logic circuit according to an embodiment of the present disclosure.

FIG. 8 is a diagram illustrating the conversion circuit 731 and the storage circuit 732 of the logic circuit 730 according to an embodiment of the present disclosure. The conversion circuit 731 includes AND gates 811, 812, 813 and 814, an inverter 815, and a D flip flop 816. As shown in FIG. 4, the AND gate 811 receives the inverse of the outputs Q2-Q4 while the AND gate 812 receives the inverse of the outputs Q2 and Q3 and the output Q4. The AND gate 813 receives the output of the AND gate 811 and the detecting result DR while the AND gate 814 receives the output of the AND gate 812 and the detecting result DR. The D flip flop 816 is triggered by the output of the AND gate 814 and is reset by the inverse of the output of the AND gate 813. When the coding condition is fit (i.e. the detecting result DR is logic value '1') and the control code CC (Q2, Q3, Q4) is a code instructing a falling event of the control signal CTRL (in this embodiment, the control code (Q2, Q3, Q4)=(0,0,0)), the conversion circuit 731 pulls down the control signal CTRL to the logic low (i.e. the logic value '0'). On the other hand, When the coding condition is fit (i.e. the detecting result DR is logic value '1') and the control code (Q2, Q3, Q4) is a code instructing a rising event of the control signal CTRL (in this embodiment, the control code (Q2, Q3, Q4)=(0,0,1)), the conversion circuit 731 pulls up the control signal CTRL to the logic high (i.e. the logic value '1').

The storage circuit 732 includes AND gates 831 and 832, and a D flip flop 833. The AND gate 831 receives the output Q2 and the inverse of the outputs Q3 and Q4 while the AND gate 832 receives the output of the AND gate 831 and the detecting result DR. The D flip flop 833 is triggered by the output of the AND gate 832 (marked as "OUT832" in FIG. 8). When the coding condition is fit (i.e. the detecting result DR is logic value '1') and the control code (Q2, Q3, Q4) is a code instructing a store operation (in this embodiment, the control code (Q2, Q3, Q4)=(1,0,0)), the storage circuit 732 stores the outputs of the registers 760_1-760_8, i.e. bit<7:0> into a register (not shown in FIG. 8) as a register signal REG<7:0>.

Those skilled in the art should readily understand the control code CC and the corresponding operation in response to the control signal CTRL shown in the embodiment of FIG. 8 is only for illustrative purpose. With different architecture of the conversion circuit 731, the control code CC and the corresponding operation in response to the control signal CTRL might be different. Those skilled in the art should readily understand that the logic gates (e.g. the AND gates shown in FIG. 8) can be easily replaced with different logic gates to achieve the same goal. In addition, the number of the registers included in the latching circuit 710 and the detecting circuit 720 are not limited in the present disclosure. With different registers included in the latching circuit 710, different bit number of the control code CC and the corresponding operation in response to the control signal CTRL might be acquired. In addition, with more bits included in the control code CC, more signals can be controlled by the logic circuit 730, that is, the logic circuit 730 may control more signals than the control signal CTRL. These alternative designs shall fall within the scope of the present disclosure.

Refer to FIG. 7 again, the reset circuit 751 of the timing control circuit 130 includes an NAND gate 751_1 which receives the detecting result DR and the clock signal ncki, and the output of the NAND gate 751_1 is coupled to the registers 710_1-710_3 and 720_1-720_2, wherein when the coding condition is fit (i.e. the detecting result is the logic value '1') and the clock signal ncki is logic high, the reset circuit 751 reset the latching circuit 710 and the detecting circuit 720. The reset circuit 752 of the timing control circuit 130 includes an NAND gate 751_1 which receives the output of the AND gate 832 (marked as 'OUT832' in FIG. 7) and the clock signal ncki, the output of the NAND gate 752_1 is coupled to the registers 760_1-760_8, wherein when the output OUT832 is logic high (that is, the control code CC instructs the store operation) and the clock signal ncki is logic high, the reset circuit 752 reset the register circuit 760.

Figure 9:
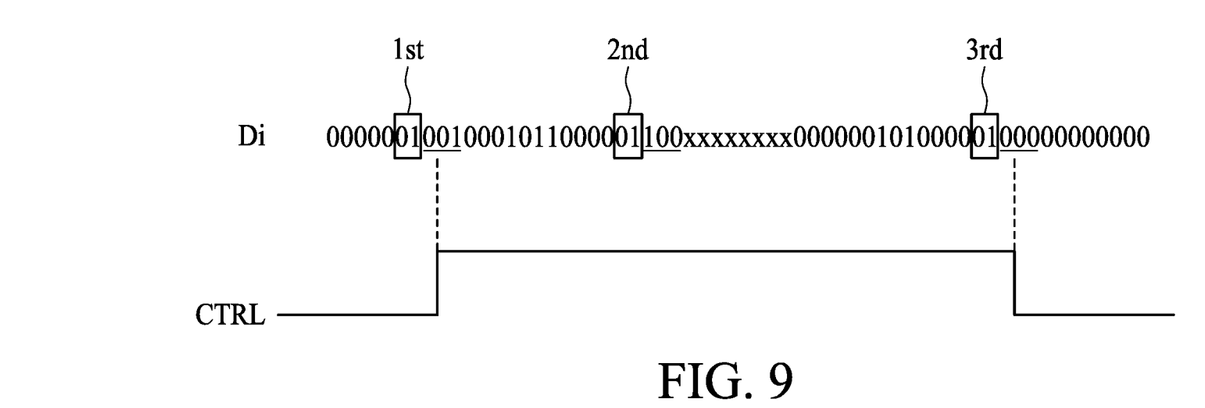
FIG. 9 is a diagram illustrating the operation of generating the reset control signal and the gate control signal based on the input signal according to an embodiment of the present disclosure.

Refer to FIG. 9 in conjunction with FIG. 7 and FIG. 8, wherein FIG. 9 is a diagram illustrating the operation of generating the control signal CTRL based on the input signal Di according to an embodiment of the present disclosure. As shown in FIG. 9, when the detecting circuit 720 detects two consecutive bits (0,1), the next three consecutive bits (marked with an underline) currently stored in the latching circuit 710 forms the control code CC to instruct the logic circuit 730 to execute the corresponding conversion operation in response to the control signal CTRL. For example, for the first time the two consecutive bits (0,1) is detected by the detecting circuit 720, the next three consecutive bits currently stored in the latching circuit 710 are (0, 0, 1) which is a control code instructing a rising event of the control signal CTRL. Therefore, the control signal CTRL is pulled up to the logic high as shown in FIG. 9. For the second time the two consecutive bits (0,1) is detected by the detecting circuit 720, the next three consecutive bits currently stored in the latching circuit 710 are (1, 0, 0) which is a control code instructing a store operation. Therefore, the next 8 bits (i.e. bit<7:0> which is marked as 'xxxxxxxx' in FIG. 9) are stored in the register as the register signal REG<7:0>. For the third time the two consecutive bits (0,1) is detected by the detecting circuit 720, the next three consecutive bits currently stored in the latching circuit 710 are (0, 0, 0) which is a code instructing a falling event of the control signal CTRL. Therefore, the control signal CTRL is pulled down to the logic low as shown in FIG. 9. Therefore, the control signal CTRL is easily controlled by the single bit digital signal Di.

Figure 10A:
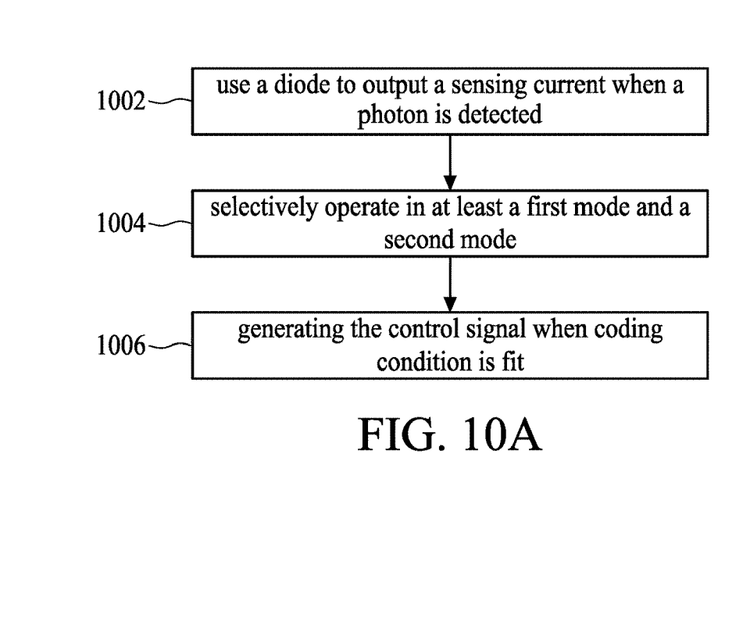
FIG. 10A is a flowchart illustrating a method of the image sensor system according to an embodiment of the present disclosure.

FIG. 10A is a flowchart illustrating a method 1000 of the image sensor system 10 according to an embodiment of the present disclosure. Provided that the result is substantially the same, the steps in FIG. 10A are not required to be executed in the exact order. The method is summarized as follows.

Step 1002: use a diode to output a sensing current when a photon is detected.

Step 1004: selectively operate in at least a first mode and a second mode.

Step 1006: generate the control signal when a coding condition is fit.

Those skilled in the art should readily understand the operation of the method 1000 of the image system 10 after reading the embodiments of FIG. 1-FIG. 9. The detailed description is omitted here for brevity.

Figure 10B:
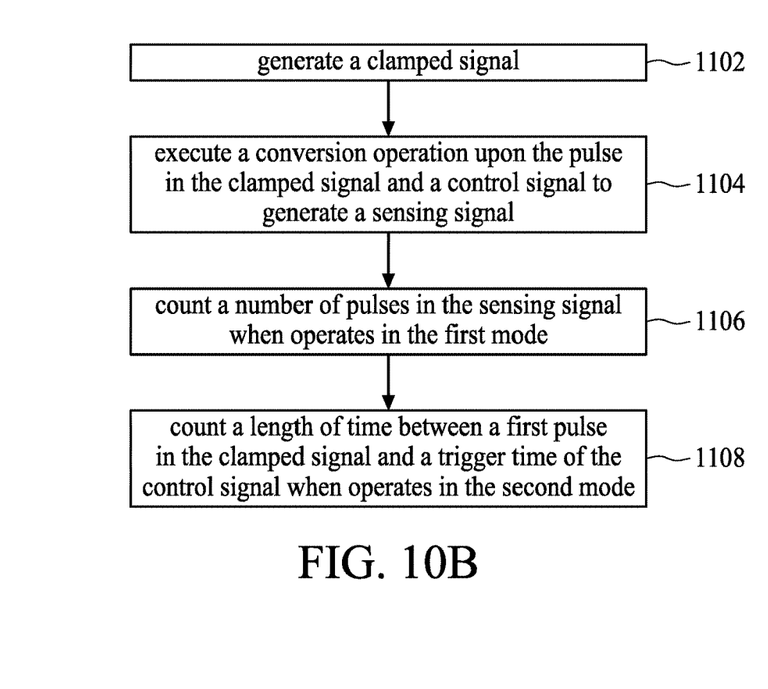
FIG. 10B is a flowchart illustrating the steps of selectively operating in at least a first mode and a second mode according to an embodiment of the present disclosure.

FIG. 10B is a flowchart illustrating the step of selectively operating in at least a first mode and a second mode according to an embodiment of the present disclosure. Provided that the result is substantially the same, the steps in FIG. 10B are not required to be executed in the exact order. The method is summarized as follows.

Step 1102: generate a clamped signal.

Step 1104: execute a conversion operation upon the pulse in the clamped signal and a control signal to generate a sensing signal.

Step 1106: count a number of pulses in the sensing signal when operates in the first mode.

Step 1108: count a length of time between a first pulse in the clamped signal and a trigger time point of the control signal when operates in the second mode.

Those skilled in the art should readily understand the flowchart of the embodiment of FIG. 10B after reading the embodiments of FIG. 1-FIG. 9. The detailed description is omitted here for brevity.

Briefly summarized, the embodiments of the present disclosure proposed an image sensor system, a readout circuit thereof and an associated method. With the proposed architectures, the number of the readout circuits can be greatly reduced to reduce the consumed chip area and power.

In some embodiments, an image sensor system is disclosed. The image sensor system includes an image sensor, wherein the image sensor includes a plurality of diodes, and one of the plurality of diodes outputs a sensing current when a photon is detected; a readout circuit, coupled to the image sensor, wherein the readout circuit is arranged to selectively operates in at least a first mode and a second mode, and the readout circuit includes: a clamping circuit, arranged to generate a clamped signal, wherein the clamped signal is asserted as a pulse when the sensing current is received; and a first logic circuit, coupled to the clamping circuit, arranged to execute a conversion operation upon the pulse and a control signal to generate a sensing signal; wherein the readout circuit counts a number of pulses in the sensing signal when operates in the first mode, and counts a length of time period between a first pulse in the clamped signal and a trigger time point of the control signal corresponding to the first pulse when operates in the second mode; and a timing control circuit, coupled to the readout circuit, wherein the timing control circuit is arranged to determine if a coding condition is fit according to an input signal and generate the control signal when the coding condition is fit, wherein the input signal includes a plurality of bits serially input to the timing control circuit, and each bit of the plurality of bits corresponds to each pulse of a clock signal respectively.

In some embodiments, a method of an image sensor system including an image sensor is disclosed. The method includes: using a diode to output a sensing current when a photon is detected; selectively operating in at least a first mode and a second mode, including: generating a clamped signal, wherein the clamped signal is asserted as a pulse when the sensing current is received; and executing a conversion operation upon the pulse in the clamped signal and a control signal to generate a sensing signal; counting a number of pulses in the sensing signal when operates in the first mode; and counting a length of time period between a first pulse in the clamped signal and a trigger time point of the control signal corresponding to the first pulse when operates in the second mode; and determining if a coding condition is fit according to an input signal and generating the control signal when the coding condition is fit, wherein the input signal includes a plurality of bits serially input to the timing control circuit, and each bit of the plurality of bits corresponds to each pulse of a clock signal respectively.

In some embodiments, a readout circuit of an image sensor system including an image sensor, wherein the image sensor includes a plurality of diodes, and each of the plurality of diodes generates a sensing current when a photon is detected, and the readout circuit is arranged to selectively operates in at least a first mode and a second mode. The readout circuit includes a clamping circuit, arranged to generate a clamped signal, wherein the clamped signal is asserted as a pulse when the sensing current is received; and a first logic circuit, coupled to the clamping circuit, arranged to execute a conversion operation upon the pulse in the clamped signal and a control signal to generate a sensing signal; wherein the readout circuit counts a number of pulses in the sensing signal when operates in the first mode, and counts a length of time period between a first pulse in the clamped signal and a trigger time point of the control signal corresponding to the first pulse when operates in the second mode.

What is claimed is:

1. An image sensor system, comprising:
   an image sensor, wherein the image sensor comprises a plurality of diodes, and one of the plurality of diodes outputs a sensing current when a photon is detected;
   a readout circuit, coupled to the image sensor, wherein the readout circuit is, arranged to selectively operates in at least a first mode and a second mode, and the readout circuit comprises:
      a clamping circuit, arranged to generate a clamped signal, wherein the clamped signal is asserted as a pulse when the sensing current is received; and
      a first logic circuit, coupled to the clamping circuit, arranged to execute a conversion operation upon the pulse and a control signal to generate a sensing signal;
   wherein the readout circuit counts a number of pulses in the sensing signal when operates in the first mode, and counts a length of time period between a first pulse in the clamped signal and a trigger time point of the control signal corresponding to the first pulse when operates in the second mode; and
      a timing control circuit, coupled to the readout circuit, wherein the timing control circuit is arranged to determine if a coding condition is fit according to an input signal and generate the control signal when the coding condition is fit, wherein the input signal includes a plurality of bits serially input to the timing control circuit, and each bit of the plurality of bits corresponds to each pulse of a clock signal respectively.
2. The image sensor system of claim 1, wherein the readout circuit further comprises:
   a second logic circuit, arranged to generate a time indicating signal at least according to the sensing signal and the control signal; and
   a multiplexing circuit, coupled to the first logic circuit and the second logic circuit, wherein the multiplexing circuit is arranged to output the sensing signal when the readout circuit operates in the first mode, and output the time indicating signal when the readout circuit operates in the second mode;
   a counting circuit, coupled to the multiplexing circuit, wherein the counting circuit is arranged to count the number of pulses in the sensing signal when the readout circuit operates in the first mode, and calculate the length of time period between the first pulse in the clamped signal and the trigger time point of the control signal corresponding to the first pulse according to the time indicating signal when the readout circuit operates in the second mode.
3. The image sensor system of claim 2, wherein the second logic circuit comprises:
   a ring oscillator, arranged to generate an oscillated signal at least starting from the trigger time point of the control signal;
   a latching circuit, arranged to generate a trigger signal according to the sensing signal and the control signal; and
   a conversion circuit, coupled to the latching circuit and the ring oscillator, wherein when the readout circuit operates in the second mode, the conversion circuit is arranged to output the oscillated signal as the time indicating signal when the trigger signal indicates that the control signal is triggered and stop outputting the oscillated signal when the trigger signal indicates that a first pulse of the sensing signal is received.
4. The image sensor system of claim 3, wherein the readout circuit is further arranged to selectively operate in a third mode, and the readout circuit counts a length of time period between two pulses in the clamped signal when operates in the third mode.
5. The image sensor system of claim 4, wherein the multiplexing circuit is further arranged to output the time indicating signal when the readout circuit operates in the third mode, and the counting circuit is further arranged to calculate the length of time period between two pulses in the clamped signal when the readout circuit operates in the third mode.
6. The image sensor system of claim 5, wherein when the readout circuit operates in the third mode, the conversion circuit is further arranged to output the oscillated signal as the time indicating signal when the trigger signal indicates that two pulses in the clamped signal is received.
7. The image sensor system of claim 1, wherein the coding condition is fit when at least two consecutive bit of the input signal is an action code.
8. The image sensor system of claim 7, wherein the timing control circuit comprises:
   a latching circuit, arranged to latch at least three consecutive bits of the input signal as a control code;
   a detecting circuit, coupled to the latching circuit, wherein the latching circuit is arranged to detect said at least two consecutive bits of the input signal to generate a detecting result indicating whether the coding condition is fit; and
   a second logic circuit, coupled to the detecting circuit and the latching circuit, wherein the second logic circuit is arranged to execute a conversion operation upon the control code to generate the control signal when the detecting result indicates that the coding condition is fit.

9. The image sensor system of claim 8, wherein the second logic circuit is further arranged to store a data package of the input signal into a register when the coding condition is fit and the control code is a storage code, and the data package of the input signal includes a plurality of consecutive bits.

10. The image sensor system of claim 9, wherein the timing control circuit further comprises:
a reset circuit, coupled to the detect circuit and the latch circuit, wherein the reset circuit is arranged to generate a reset signal to reset the detect circuit and the latch circuit when the detecting result indicates that the coding condition is fit.

11. A method of an image sensor system comprising an image sensor, comprising:
using a diode to output a sensing current when a photon is detected;
selectively operating in at leapt a flat mode and a second mode, comprising:
generating a clamped signal, wherein the clamped signal is asserted as a pulse when the sensing current is received; and
executing a conversion operation upon the pulse in the clamped signal and a control signal to generate a sensing signal;
counting a number of pulses in the sensing signal when operates in the first mode; and
counting a length of time period between a first pulse in the clamped signal and a trigger time point of the control signal corresponding to the first pulse when operates in the second mode; and
determining if a coding condition is fit according to an input signal and generating the control signal when the coding condition is fit, wherein the input signal includes a plurality of bits serially input to the timing control circuit, and each bit of the plurality of bits corresponds to each pulse of a clock signal respectively.

12. The method of claim 11, wherein steps of selectively operating in at least the first mode and the second mode comprises:
generating a time indicating signal at least according to the sensing signal and the control signal; and
outputting the sensing signal when operating in the first mode, and outputting the time indicating signal when operating in the second mode;
counting the number of pulses in the sensing signal when operating in the first mode, and calculating the length of time period between the first pulse in the clamped signal and the trigger time point of the control signal corresponding to the first pulse according to the time indicating signal when operating in the second mode.

13. The method of claim 12, wherein steps of generating the time indicating signal according to the sensing signal and the control signal comprises:
using a ring oscillator to generate a oscillated signal at least starting from the trigger time point of the control signal;
generating a trigger signal according to the sensing signal and the control signal;
outputting the oscillated signal as the time indicating signal when the trigger signal indicates that the control signal is triggered; and
stopping outputting the oscillated signal when the trigger signal indicates that a first pulse of the sensing signal is received.

14. The method of claim 12, further comprising:
selectively operating in a third mode; and
counting a length of time period between two pulses in the clamped signal when operating in the third mode.

15. The method of claim 14, further comprising:
outputting the time indicating signal when operating in the third mode; and
calculating the length of time period between two pulses in the clamped signal when operating in the third mode.

16. The method of claim 15, steps of generating the time indicating signal according to the sensing signal and the control signal comprises:
generating a oscillated signal at the trigger time point of the control signal;
generating a trigger signal according to the sensing signal and the control signal;
outputting the oscillated signal as the time indicating signal when the trigger signal indicates that the first pulse in the clamped signal is received; and
stopping outputting the oscillated signal when the second pulse in the clamped signal is received.

17. The method of claim 11, wherein the coding condition is fit when at least two consecutive bit of the input signal is an action code.

18. A readout circuit of an image sensor system comprising an image sensor, wherein the image sensor comprises a plurality of diodes, and each of the plurality of diodes generates a sensing current when a photon is detected, and the readout circuit is arranged to selectively operates in at least a first mode and a second mode, the readout circuit comprising:
a clamping circuit, arranged to generate a clamped signal, wherein the clamped signal is asserted as a pulse when the sensing current is received; and
a first logic circuit, coupled to the clamping circuit, arranged to execute a conversion operation upon the pulse in the clamped signal and a control signal to generate a sensing signal;
wherein the readout circuit counts a number of pulses in the sensing signal when operates in the first mode, and counts a length of time period between a first pulse in the clamped signal and a trigger time point of the control signal corresponding to the first pulse when operates in the second mode.

19. The readout circuit of claim 18, further comprising:
a second logic circuit, arranged to generate a time indicating signal at least according to the sensing signal and the control signal; and
a multiplexing circuit, coupled to the first logic circuit and the second logic circuit, wherein the multiplexing circuit is arranged to output the sensing signal when the readout circuit operates in the first mode, and output the time indicating signal when the readout circuit operates in the second mode;
a counting circuit, coupled to the multiplexing circuit, wherein the counting circuit is arranged to count the number of pulses in the sensing signal when the readout circuit operates in the first mode, and calculate the length of time period between the first pulse in the clamped signal and the trigger time point of the control signal according to the time indicating signal when the readout circuit operates in the second mode.

20. The readout circuit of claim 18, further comprising:

a ring oscillator, arranged to generate an oscillated signal at least starting from the trigger time point of the control signal;

a latching circuit, arranged to generate a trigger signal according to the sensing signal and the control signal; and a conversion circuit, coupled to the latching circuit and the ring oscillator, wherein the conversion circuit is arranged to output the oscillated signal as the time indicating signal when the trigger signal indicates that the control signal is triggered and stop outputting the oscillated signal when the trigger signal indicates that a first pulse of the sensing signal is received.

* * * * *